United States Patent [19]

Pasternak

[11] Patent Number: 5,037,556

[45] Date of Patent: Aug. 6, 1991

[54] MEMBRANE SEPARATION OF N-METHYL PYRROLIDONE/MIDDLE DISTILLATE STREAMS

[75] Inventor: Mordechai Pasternak, Spring Valley, N.Y.

[73] Assignee: Texaco Inc., White Plains, N.Y.

[21] Appl. No.: 636,537

[22] Filed: Dec. 31, 1990

[51] Int. Cl.$^5$ .............................................. B01D 61/08
[52] U.S. Cl. ................................. 210/654; 210/500.36
[58] Field of Search .................. 210/651, 654, 500.36; 208/308; 585/818

[56] References Cited

U.S. PATENT DOCUMENTS 4,982,051  1/1991  Pasternak et al. ......... 210/500.36 X

*Primary Examiner*—Frank Spear
*Attorney, Agent, or Firm*—Robert A. Kulason; James J. O'Loughlin; Carl G. Seutter

[57] ABSTRACT

An N-methyl pyrrolidone-containing middle distillate stream is separated by use of a polyethyleneimine membrane which has been cross-linked with a polyisocyanate or a poly(carbonyl chloride) cross-linking agent.

8 Claims, No Drawings

MEMBRANE SEPARATION OF N-METHYL PYRROLIDONE/MIDDLE DISTILLATE STREAMS

FIELD OF THE INVENTION

This invention relates to the separation of a N-methyl pyrrolidone/middle distillate stream. More particularly it relates to separation of N-methyl pyrrolidone from the product streams from a unit wherein N-methyl pyrrolidone is used to extract undesirable components from middle distillates such as diesel oil.

BACKGROUND OF THE INVENTION

As is well known to those skilled in the art, middle distillates such as diesel oils, cracking stocks, and catalytic cycle oils as produced are characterized by various deficiencies including poor cetane number and burning quality.

It is common to attempt to improve the quality of these hydrocarbon stocks by extracting the undesirable components which are responsible for the deficiencies. These stocks may for example be treated with N-methyl pyrrolidone which may extract aromatics, olefins, and compounds of nitrogen, oxygen, and sulfur from the middle distillate oil. The treated oil is typically characterized by improved properties.

A substantial portion of the cost of an N-methyl pyrrolidone treating unit lies in the several distillation columns and associated equipment including fired heaters, heat exchangers, pumps, etc; and the cost of operation is clearly large because of the cost of heat and power associated with these operations.

It is an object of this invention to provide a novel process for N-methyl pyrrolidone treating of middle distillates. It is a particular object of this invention to provide a process which minimizes the need to provide distillation steps and which permits substantial savings in operating costs. Other objects will be apparent to those skilled in the art.

STATEMENT OF THE INVENTION

In accordance with certain of its aspects, this invention is directed to a process which comprises passing a charge containing N-methyl pyrrolidone and a middle distillate hydrocarbon into contact with, as a separation membrane, a non-porous separating polyimine layer which has been cross-linked with a polyisocyanate or with a poly (carbonyl chloride) cross-linking agent;

maintaining a pressure drop across said membrane thereby forming a high pressure retentate containing increased content of middle distillate hydrocarbon and decreased content of N-methyl pyrrolidone and a lower pressure permeate containing decreased content of middle distillate hydrocarbon and increased content of N-methyl pyrrolidone;

maintaining the pressure on the low pressure discharge side of said membrane above the vapor pressure of said permeate thereby maintaining said permeate in liquid phase;

maintaining the pressure on the high pressure retentate side of said membrane above the vapor pressure of said retentate thereby maintaining said retentate in liquid phase;

recovering said permeate of increased content of N-methyl pyrrolidone and decreased content of middle distillate hydrocarbon from the low pressure discharge side of said membrane; and recovering said retentate of increased content of middle distillate hydrocarbon and decreased content of N-methyl pyrrolidone from the high pressure side of said membrane.

DESCRIPTION OF THE INVENTION

The charge which may be treated according to the process of this invention may be a middle mixture containing N-methyl pyrrolidone and a charge distillate hydrocarbon oil. The middle distillate hydrocarbon oil may characterized by the following properties:

TABLE

| PROPERTY | BROAD | PREFERRED | TYPICAL |
|---|---|---|---|
| API Gravity | 7–44 | 20–40 | 30 |
| Aromatic Content w % | 15–90 | 20–60 | 40 |
| Cetane No | 19–52 | 25–50 | 35 |
| Viscosity SUS 100° F. | <32–750 | <32–100 | 10 |
| Pour Point °F. minus | 50–100 | 0–60 | 30 |
| Sulfur w % | 0.02–5 | 0.2–1.5 | |
| Color ASTM | <0.5–7 | <1–3 | 2 |
| Boiling Range °F. | | | |
| ibp | 330–700 | 380–630 | 450 |
| 50% | 410–900 | 500–800 | 650 |
| ep | 500–1100 | 600–1050 | 900 |

These charge oils may include diesel oils, cracking stock, catalytic cycle oils, etc. When the charge oil is a diesel oil, it may be characterized by the following properties

TABLE

| PROPERTY | BROAD | PREFERRED | TYPICAL |
|---|---|---|---|
| API Gravity | 31–44 | 36–40 | 38 |
| Aromatic Content w % | 15–40 | 20–30 | 25 |
| Cetane No | 37–52 | 46–50 | 48 |
| Viscosity SUS 100° F. | <32–38 | 36–37 | 36 |
| *Pour Point °F. | 0–minus 50 | minus 20–minus 40 | minus 30 |
| Sulfur w % | 0.02–0.4 | 0.02–0.1 | 0.07 |
| Color ASTM | 1–2 | 1–1.5 | 1.2 |
| Boiling Range °F. | | | |
| ibp | 330–400 | 380–400 | 390 |
| 50% | 410–540 | 500–520 | 510 |
| ep | 500–660 | 600–620 | 610 |

*Pour Point dependent upon season of year

When the charge oil is a Vacuum Gas Oil (VGO) cracking stock, it may be characterized by the following properties:

TABLE

| PROPERTY | BROAD | PREFERRED | TYPICAL |
|---|---|---|---|
| API Gravity | 20–40 | 25–30 | 37 |
| Aromatic Content w % | 20–60 | 40–60 | 50 |
| Viscosity SUS 100° F. | 42–60 | 46–56 | 50 |
| Pour Point °F. | 20–100 | 40–60 | 50 |
| Sulfur w % | 0.2–5 | 1–3 | 2 |
| Boiling Range °F. | | | |
| ibp | 400–700 | 630–670 | 650 |
| 50% | 600–900 | 780–820 | 800 |
| ep | 950–1100 | 1000–1050 | 1000 |

When the charge oil is a Light Cycle Gas Oil (LCGO) catalytic cycle oil, it may be characterized by the following properties:

TABLE

| PROPERTY | BROAD | PRE-FERRED | TYPICAL |
| --- | --- | --- | --- |
| API Gravity | 7–30 | 20–25 | 22 |
| Aromatic Content w % | 40–90 | 50–60 | 55 |
| Cetane No | 19–39 | 25–35 | 30 |
| Viscosity SUS 100° F. | 35–50 | 36–40 | 38 |
| Pour Point °F. | 0–30 | 0–10 | 5 |
| Sulfur w % | 0.5–1.5 | 0.5–0.8 | 0.7 |
| Color ASTM | 5–7 | 5–6 | 5 |
| Boiling Range °F. | | | |
| ibp | 400–480 | 430–460 | 445 |
| 50% | 500–650 | 540–580 | 560 |
| ep | 630–750 | 640–660 | 650 |

The charge mixture of N-methyl pyrrolidone and charge middle distillate hydrocarbon oil may typically contain 10–80 w %, commonly 10–25 w %, say 17 w % N-methyl pyrollidone in admixture with a middle distillate or more commonly a raffinate from solvent extraction of middle distillate (thus containing decreased quantities of undesirables such as aromatics).

It is a feature of this invention that separation of the N-methyl pyrrolidone-containing streams may be effected by a pressure driven process utilizing a composite structure which includes a separation layer.

THE MEMBRANE ASSEMBLY

The process of this invention may be carried out by use of a composite structure which in one preferred embodiment may include (i) a carrier layer which provides mechanical strength, (ii) a porous support layer, and (iii) a separating layer across which separation occurs.

The composite structure of this invention includes a multi-layer assembly which in the preferred embodiment preferably includes a porous carrier layer which provides mechanical strength and support to the assembly.

THE CARRIER LAYER

This carrier layer, when used, is characterized by its high degree of porosity and mechanical strength. It may be fibrous or non-fibrous, woven or non-woven. In the preferred embodiment, the carrier layer may be a porous, flexible, woven fibrous polyester. A typical polyester carrier layer may be formulated of non-woven, thermally-bonded strands.

One typical non-woven polyester carrier layer may be formulated of non-woven, thermally-bonded strands and characterized by a fabric weight of 80±8 grams per square yard, a thickness of 4.2±0.5 mils, a tensile strength (in the machine direction) of 31 psi and (in cross direction) of 10 psi, and a Frazier air permeability of 6 cuft/min/sq. ft. @0.5 inches of water.

THE POROUS SUPPORT LAYER

The porous support layer (typically an ultrafiltration membrane) which may be used in practice of this invention may be formed of polyacrylonitrile polymer. Typically the polyacrylonitrile may be of thickness of 40–80 microns, say 50 microns and is preferably characterized by a pore size of less than about 500A and typically about 200A. This corresponds to a molecular weight cut-off of less than about 100,000, typically about 40,000.

THE SEPARATING LAYER

The separating layer which permits attainment of separation in accordance with the process of this invention includes a non-porous film or membrane of 0.2–1.5 microns, say about 0.5 microns of a polyimine polymer of molecular weight $\overline{M}_n$ of about 40,000–100,000, say about 60,000 (prior to cross-linking), which is cross-linked by urea or amide linkages.

The separating layer may be prepared by cross-linking a polyimine polymer in situ.

In the preferred embodiment, the polyimine polymer is cross-linked in situ. Polyimine polymers are characterized by the presence of recurring —N—R″—groups as integral parts of the main polymer chain. Typical structural formula of linear polyimines may be represented as

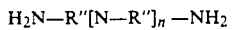

$$H_2N-R''[N-R'']_n-NH_2$$

wherein n represents the degree of polymerization or number of recurring groups in the polymer chain.

In the above formula, R″ may preferably be a hydrocarbon group selected from the group consisting of alkylene, aralkylene, cycloalkylene, arylene, and alkarylene, including such radicals when inertly substituted. When R″ is alkylene, it may typically be methylene, ethylene, n-propylene, iso-propylene, n-butylene, i-butylene, sec-butylene, amylene, octylene, decylene, octadecylene, etc. When R″ is aralkylene, it may typically be benzylene, beta-phenylethylene, etc. When R″ is cycloalkylene, it may typically be cyclohexylene, cycloheptylene, cyclooctylene, 2-methylcycloheptylene, 3-butylcyclohexylene, 3-methylcyclohexylene, etc. When R″ is arylene, it may typically be phenylene, naphthylene, etc. When R is alkarylene, it may typically be tolylene, xylylene, etc. R″ may be inertly substituted i.e. it may bear a non-reactive substitutent such as alkyl, aryl, cycloalkyl, ether, etc. typically inertly substituted R″ groups may include 3-methoxypropylene, 2-ethoxyethylene, carboethoxymethylene, 4-methylcyclohexylene, p-methylphenylene, p-methylbenzylene, 3-ethyl-5-methylphenylene, etc. The preferred R″ groups may be phenylene or lower alkylene, i.e. $C_1$–$C_{10}$ alkylene, groups including e.g. methylene, ethylene, n-propylene, i-propylene, butylene, amylene, hexylene, octylene, decylene, etc. R″ may preferably be phenylene or ethylene —$CH_2CH_2$—.

Illustrative polyimine polymers include those of molecular weight $\overline{M}_n$ of 40,000–100,000, say 60,000.

Suitable polyimines may include the following, the first listed being preferred:

TABLE

A. Cordova Chemical Company Corcat P-600 brand of polyethyleneimine resin membrane ($\overline{M}_n$ of 60,000) in 33 w % aqueous solution—Brookfield viscosity @ 25° C. of 5000 cP, Sp.Gr & 25° C. of 1.04–1.06, and pH of 10–11, having the formula

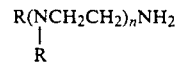

$$\underset{R}{R(NCH_2CH_2)_nNH_2}$$

wherein R is H or $(CH_2CH_2N)_x$ (containing 30% primary, 40% secondary, and 30% tertiary amines).

B. Dow Chemical Co Tydex 12 brand of polyethyleneimine membrane ($\overline{M}_n$ of 50,000) in 30 w % aqueous solution having the same formula as the Corcat P-600 membrane.

The polyethyleneimine resin in 0.01-1 w % aqueous solution, say 0.1 w % concentration is deposited on the porous support layer over 1-5 minutes, say 2 minutes, drained, and then interfacially cross-linked.

Interfacial cross-linking of the preformed polyimine polymer may be effected by contact with, as cross-linking agent.

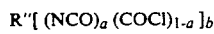

$$R''[(NCO)_a(COCl)_{1-a}]_b$$

When the isocyanate cross-linking agent $R''(NCO)_b$ (wherein a is an integer greater than 1, and preferably 2) is employed, the cross-linking forms urea bonds. When the carbonyl chloride cross-linking agent $R''(COCl)_b$ is employed, the cross-linking forms amide bonds.

The cross-linking agent $R''[(NCO)_a(COCl)_{1-a}]_b$, wherein a is 0 or 1 and b is an integer greater than 1, may be a polyisocyanate when a is 1. When a is 0, the cross-linking agent may be a poly(carbonyl chloride). Preferably a is 1 and b is 2 i.e. the preferred cross-linking agent is a diisocyanate. It will be apparent to those skilled in the art when b is 2, $R''$ may be for example alkylene. When b is greater than 2, e. g. 3, it is obvious that the above definition of $R''$ as e.g. alkylene is for convenience; and the actual hydrocarbon residue will have more than two relevant valences.

The preferred polyisocyanates (i.e. monomeric compounds bearing a plurality of -NCO isocyanate groups) may include those which contain an aromatic nucleus, typically a toluene diisocyanate or a phenylene diisocyanate.

In practice of this aspect of the invention, cross-linking is effected by contacting the surface of the porous layer with a 0.1 w %-1.0 w %, say 0.8 w % solution of cross-linking agent in solvent, typically hydrocarbon such as hexane. Contact may be at 20° C.-40° C., say 25° C. for 15-60 seconds, say 15 seconds.

Thereafter the membrane may be cured at 60° C.-100° C., say 90° C. for 10-30 minutes, say 15 minutes.

THE COMPOSITE MEMBRANE

It is a feature of this invention that it may utilize a composite membrane which comprises (i) a carrier layer characterized by mechanical strength, for supporting a porous support layer and a separating layer (ii) a porous support layer such as a polyacrylonitrile membrane of 40-80 microns, and of molecular weight cutoff of 25,000-100,000, and (iii) as a non-porous separating layer a polyimime of molecular weight $\overline{M}_n$ of 40,000-100,000, which has been cross-linked with a polyisocyanate or a poly(carbonyl chloride).

It is possible to utilize a spiral wound module which includes a non-porous separating layer membrane mounted on a porous support layer and a carrier layer, the assembly being typically folded and bonded or sealed along all the edges but an open edge—to form a bag-like unit which preferably has the separating layer on the outside. A cloth spacer, serving as the permeate or discharge channel is placed within the bag-like unit. The discharge channel projects from the open end of the unit.

There is then placed on one face of the bag-like unit, adjacent to the separating layer, and coterminous therewith, a feed channel sheet—typically formed of a plastic net.

The so-formed assembly is wrapped around a preferably cylindrical conduit which bears a plurality of perforations in the wall—preferably in a linear array which is as long as the width of the bag-like unit. The projecting portion of the discharge channel of the bag-like unit is placed over the perforations of the conduit; and the bag-like unit is wrapped around the conduit to form a spiral wound configuration. It will be apparent that, although only one feed channel is present, the single feed channel in the wound assembly will be adjacent to two faces of the membrane layer. The spiral wound configuration may be formed by wrapping the assembly around the conduit a plurality of times to form a readily handleable unit. The unit is fitted within a shell (in manner comparable to a shell-and-tube heat exchanger) provided with an inlet at one end and an outlet at the other. A baffle-like seal between the inner surface of the shell and the outer surface of the spiral-wound unit prevents fluid from bypassing the operative membrane system and insures that fluid enters the system principally at one end. The permeate passes from the feed channel, into contact with the separating layer and thence therethrough, into the permeate channel and thence therealong to and through the perforations in the conduit through which it is withdrawn as net permeate.

In use of the spiral wound membrane, charge liquid is permitted to pass through the plastic net which serves as a feed channel and thence into contact with the non-porous separating membranes. The liquid which does not pass through the membranes is withdrawn as retentate. The liquid which permeates the membrane passes into the volume occupied by the permeate spacer and through this permeate channel to the perforations in the cylindrical conduit through which it is withdrawn from the system.

In another embodiment, it is possible to utilize the system of this invention as a tubular or hollow fibre. In this embodiment, the polyacrylonitrile porous support layer may be extruded as a fine tube with a wall thickness of typically 0.001-0.1 mm. The extruded tubes are passed through a bath of polyethyleneimine which is cross-linked and cured in situ. A bundle of these tubes is secured (with an epoxy adhesive) at each end in a header; and the fibres are cut so that they are flush with the ends of the header. This tube bundle is mounted within a shell in a typical shell-and-tube assembly.

In operation, the charge liquid is admitted to the tube side and passes through the inside of the tubes and exits as retentate. During passage through the tubes, permeate passes through the non-porous separating layer and permeate is collected in the shell side.

PRESSURE DRIVEN PROCESS

It is a feature of the non-porous cross-linked polyimine separating layer that is found to be particularly effective when used in a pressure driven process. In a pressure driven process, the charge liquid containing a more permeable and a less permeable component is maintained in contact with a non-porous separating layer; and a pressure drop is maintained across that layer. A portion of the charge liquid dissolves into the membrane and diffuses therethrough. The permeate passes through the membrane and exits as a liquid.

In practice of the process of this invention, the charge (e.g. raffinate plus N-methyl pyrrolidone or extract plus N-methyl pyrrolidone) may be at 20° C.-40° C., say 25° C. and 400-1000 psig, say 800 psig and a charge rate of 800-1400, say 1200 ml/min.

The retentate which is recovered in liquid phase from the high pressure side of the membrane typically contains decreased content of N-methyl pyrrolidone when treating a typical charge (e.g. a raffinate) containing 10-1000 parts, say 200 parts of diesel oil and 100-1000 parts, say 800 parts of N-methyl pyrrolidone.

Permeate, recovered in liquid phase, in this instance may contain 1-10 parts, say 1 part of diesel oil and 40-100 parts, say 99 parts of N-methyl pyrrolidone.

Flux may typically be 0.5-5 kmh (kilograms per square meter per hour), say 1 kmh. Selectivity (measured in terms of w % N-methyl pyrrolidone in the permeate) may be as high as 90-99.9 w %. It is common to attain 99.9 w % selectivity.

It will be apparent that the process of this invention may be employed to separate N-methyl pyrrolidone from various hydrocarbon oils or from various aromatic hydrocarbons.

DESCRIPTION OF SPECIFIC EMBODIMENTS

Practice of the process of this invention may be apparent to those skilled in the art from the following examples wherein, as elsewhere in this specification, all parts are parts by weight unless otherwise stated. An asterisk (*) indicates a control example.

EXAMPLE I

In this example which represents the best mode of carrying out the process of this invention, the carrier layer is the woven polyester backing described supra. The porous support layer is the commercially available layer of Diacel DUY-L polyacrylonitrile of molecular weight cutoff of 40,000.

The polyethYleneimine PEI separating layer is fabricated from the Corcat P-600 brand of polyethyleneimine of the Table supra ($\overline{M}_n$ of 60,000). This 33 w % aqueous solution is diluted to 0.1 w % by addition of water. This solution is deposited on the porous support layer over 2 minutes and is then interfacially cross-linked.

The assembly containing the preferred microporous polyacrylonitrile supra as porous support layer and the woven polyester backing supra as carrier layer (total area Ca 45 cm$^2$) is contacted for 2 minutes with the dilute aqueous solution of polyethyleneimine. Excess solution is removed by holding the membrane assembly in a vertical position in air for one minute.

The assembly is then contacted with a cross-linking agent (0.8 w % of 2,4-toluene diisocyanate TDI in hexane) for 15 seconds during which time cross-linking occurs. The membrane assembly is then heat cured at 90° C. for 15 minutes.

The membrane is mounted in a standard cell. There is admitted to the cell and to the non-porous polyethyleneimine separating layer a charge liquid containing 25 w % N-methyl pyrrolidone and 75 w % diesel oil.

This charge is typical of the extract recovered from an N-methyl pyrrolidone treating unit in commercial practice.

Separation is carried out at 25° C. and a charge (and retentate) pressure of 800 psig. Permeate pressure is atmospheric. Selectivity is measured and reported as % Rejection which is calculated as 100x (the quantity of diesel oil in the feed minus the quantity of diesel oil in the permeate) divided by the quantitY of diesel oil in the feed. Clearly a higher selectivity is desired, as this means that the retentate desirably contains less N-methyl pyrrolidone and the permeate desirably contains more N-methyl pyrrolidone. Flux is measured as kilograms per square meter per hour (kmh).

In this example the selectivity is 99.9% Rejection and the Flux is 0.7 kmh.

EXAMPLE II-VII

In this series of Examples, the procedure of Example I was carried out except:
(i) The charge liquid contained 33 w % N-methyl pyrrolidone and 67 w % diesel oil.
(ii) The concentration of toluene diisocyanate (TDI), the curing temperature T° C. and the curing time minutes are varied as shown in the Table.

The Selectivity (Sel), in terms of the % rejection, and the Flux (kilograms per square meter per hour kmh) are reported.

TABLE

| Example | TDI | T °C. | t Min | Sel | Flux |
|---------|-----|-------|-------|------|------|
| II | 0.2 | 80 | 15 | 99.9 | 0.2 |
| III | 0.8 | 80 | 15 | 99.9 | 0.2 |
| IV | 0.2 | 90 | 15 | 99.9 | 0.2 |
| V | 0.2 | 90 | 25 | 99.9 | 0.4 |
| VI | 0.8 | 90 | 15 | 79.3 | 0.3 |
| VII | 0.8 | 90 | 25 | 77.1 | 0.6 |

EXAMPLES VIII-XIII

In this series of Examples, the procedure of Examples II-VII is followed except that the charge liquid contain 25 w % N-methyl pyrrolidone and 75 w T diesel oil.

TABLE

| Example | TDI | T °C. | t Min | Sel | Flux |
|---------|-----|-------|-------|------|------|
| I | 0.8 | 90 | 15 | 99.9 | 0.7 |
| VIII | 0.2 | 80 | 15 | 99.9 | 0.2 |
| IX | 0.8 | 80 | 15 | 99.9 | 0.2 |
| X | 0.2 | 90 | 15 | 99.9 | 0.4 |
| XI | 0.2 | 90 | 25 | 93.7 | 1.0 |
| XII | 0.8 | 90 | 25 | 99.9 | 0.6 |

From the above Table, it is apparent that best results with this charge are attained (if Selectivity is the criterion) in Example I which shows Selectivity or 99.9 w % at a Flux of 0.7 kmh or (if Flux is the criterion) in Example XI which shows a Flux of 1.0 kmh although at a somewhat decreased Selectivity of 93.7%.

Results comparable to the above may be attained if other middle distillates are employed i.e. the raffinate and extract streams leaving a N-methyl pyrrolidone unit in which other middle distillates have been treated.

TABLE

| Example | Middle Distillates |
|---------|--------------------|
| XIII | Cracking Stock such as light gas oil |
| XIV | Catalytic Cycle Oil |
| XV | Kerosene |

It is a feature of the process of this invention that the oils which have been treated are characterized by improved cetane number; by decreased content of aromatics, olefins, oxygen compounds, sulfur compounds, nitrogen compounds, and metals.

Although this invention has been illustrated by reference to specific embodiments, it will be apparent to those skilled in the art that various charges and modifications may be made which clearly fall within the scope of the invention.

What is claimed is:

1. The process which comprises:

passing a charge containing N-methyl pyrrolidone and a middle distillate hydrocarbon into contact with, as a separation membrane, a non-porous separating polyimine layer which has been cross-linked with a polyisocyanate or with a poly (carbonyl chloride) cross-linking agent;

maintaining a pressure drop across said membrane thereby forming a high pressure retentate containing increased content of middle distillate hydrocarbon and decreased content of N-methyl pyrrolidone and a lower pressure permeate containing decreased content of middle distillate hydrocarbon and increased content of N-methyl pyrrolidone;

maintaining the pressure on the low pressure discharge side of said membrane above the vapor pressure of said permeate thereby maintaining said permeate in liquid phase;

maintaining the pressure on the high pressure retentate side of said membrane above the vapor pressure of said retentate thereby maintaining said retentate in liquid phase;

recovering said permeate of increased content of N-methyl pyrrolidone and decreased content of middle distillate hydrocarbon from the low pressure discharge side of said membrane; and recovering said retentate of increased content of middle distillate hydrocarbon and decreased content of N-methyl pyrrolidone from the high pressure side of said membrane.

2. The process as claimed in claim 1 wherein said middle distillate is a diesel oil.

3. The process as claimed in claim 1 wherein said middle distillate is a cracking stock.

4. The process as claimed in claim 1 wherein said middle distillate is a catalytic cycle oil.

5. The process as claimed in claim 1 wherein said cross-linking agent is a toluene diisocyanate.

6. The process as claimed in claim 1 wherein said cross-linking agent is a toluene diisocyanate plus a hexamethylene diisocyanate.

7. The process as claimed in claim 1 wherein said polyethyleneimine membrane is $$H_2NR''[N-R'']_n-NH_2$$

wherein R'' is an alkylene, aralkylene, cycloalkylene, arylene, or alkarylene hydrocarbon group and is the number of recurring group in the polymer chain.

8. The process as claimed in claim 7 wherein R'' is ethylene—$CH_2CH_2$—.

* * * * *

UNITED STATES PATENT AND TRADEMARK OFFICE
CERTIFICATE OF CORRECTION

PATENT NO. : 5,037,556

DATED : August 6, 1991

INVENTOR(S) : Mordechai Pasternak

It is certified that error appears in the above-identified patent and that said Letters Patent is hereby corrected as shown below:

Col 4, line 58, cancel "&", insert -- @ --;

Col 6, line 55, after "that", insert -- it --;

Col 7, line 34, correct the spelling of "polyethyleneimine";

Col 8, line 31, cancel "T"; and insert -- 0/0 --.

Col 10, line 24, after "and", insert -- n --;

Signed and Sealed this

Twenty-fourth Day of August, 1993

Attest:

BRUCE LEHMAN

*Attesting Officer*   *Commissioner of Patents and Trademarks*